(12) United States Patent
Ouyang

(10) Patent No.: US 11,483,304 B2
(45) Date of Patent: Oct. 25, 2022

(54) METHOD FOR SETTING PASSWORD FOR ELECTRONIC CIGARETTE, SYSTEM, STORAGE MEDIUM, AND ELECTRONIC CIGARETTE

(71) Applicant: SHENZHEN IVPS TECHNOLOGY CO., LTD., Shenzhen (CN)

(72) Inventor: Junwei Ouyang, Shenzhen (CN)

(73) Assignee: SHENZHEN IVPS TECHNOLOGY CO., LTD, Guangdong (CN)

(*) Notice: Subject to any disclaimer, the term of this patent is extended or adjusted under 35 U.S.C. 154(b) by 219 days.

(21) Appl. No.: 16/523,621

(22) Filed: Jul. 26, 2019

(65) Prior Publication Data
US 2020/0065462 A1   Feb. 27, 2020

(30) Foreign Application Priority Data
Aug. 27, 2018   (CN) .......................... 201810985499.4

(51) Int. Cl.
*H04L 29/06* (2006.01)
*H04L 9/40* (2022.01)
*G06F 21/32* (2013.01)
*G06F 21/35* (2013.01)

(52) U.S. Cl.
CPC ............ *H04L 63/083* (2013.01); *G06F 21/32* (2013.01); *G06F 21/35* (2013.01)

(58) Field of Classification Search
CPC ....... G06F 21/32; G06F 21/35; H04L 63/083; H04L 63/061; H04L 63/0876; H04W 12/50; H04W 12/06; G07C 9/00174
See application file for complete search history.

(56) References Cited

U.S. PATENT DOCUMENTS

| | | |
|---|---|---|
| 2013/0342314 A1 | 12/2013 | Chen et al. |
| 2016/0269375 A1 | 9/2016 | Wu |
| 2016/0331035 A1* | 11/2016 | Cameron ............... G08C 17/02 |
| 2018/0213848 A1 | 8/2018 | Qiu |
| 2020/0352249 A1* | 11/2020 | Achtien .................. A24F 40/65 |

FOREIGN PATENT DOCUMENTS

| | | |
|---|---|---|
| CN | 107612901 A | 1/2018 |
| EP | 2306361 A1 | 4/2011 |

* cited by examiner

*Primary Examiner* — Huan V Doan
(74) *Attorney, Agent, or Firm* — IP-PAL Patent US; Klaus Michael Schmid

(57) ABSTRACT

The present invention discloses a method for setting a password for an electronic cigarette, a system, a storage medium, and an electronic cigarette, the method comprising: sending, by a mobile terminal, a request for setting a password to the electronic cigarette, wherein the request carries an application identifier; searching, by the electronic cigarette, for the corresponding password information according to the received application identifier, and feeding back the first information in which a password is not set to the mobile terminal when the corresponding password information is not found; when the mobile terminal receives the first information, displaying a password setting interface for the user to set a password and sending the password set by the user to the electronic cigarette; receiving, by the electronic cigarette, the password, and saving the password in association with the application identifier to generate the password information of a corresponding application.

9 Claims, 4 Drawing Sheets

METHOD FOR SETTING PASSWORD FOR ELECTRONIC CIGARETTE, SYSTEM, STORAGE MEDIUM, AND ELECTRONIC CIGARETTE

TECHNICAL FIELD

The present invention relates to the field of electronic cigarette technology, and in particular, to a method for setting a password for an electronic cigarette, a system, a storage medium, and an electronic cigarette.

BACKGROUND

As an alternative to cigarettes, electronic cigarettes are increasingly popular in the market because of their safety, convenience, health and environmental protection to a certain extent. The existing electronic cigarette is usually provided with a physical control switch, such as a button, etc. As long as the control switch is operated, the atomizer of the electronic cigarette starts to work, and the user can smoke the electronic cigarette.

However, the existing electronic cigarette does not have protection functions for different groups of people. Anyone who gets the electronic cigarette can smoke the electronic cigarette as long as the control switch is operated. For young children, it is easy to cause accidental smoking, which brings certain harm to the safety and health of young children. Even if it is an adult, if the non-owner of the electronic cigarette smokes it at will, the use and health of the electronic cigarette cannot be guaranteed.

Therefore, the prior art has yet to be improved and advanced.

SUMMARY

The technical problem to be solved by the present invention is to provide a method for setting a password for an electronic cigarette, a system, a storage medium and an electronic cigarette, aiming at the deficiencies of the prior art, so as to solve the problem of lack of privilege protection of various functions of the existing electronic cigarette.

In order to solve the above technical problem, the technical solution adopted by the present invention is as follows.

A method for setting a password for an electronic cigarette comprises:

sending, by a mobile terminal, a request for setting a password to the electronic cigarette, wherein the request carries an application identifier;

searching, by the electronic cigarette, for the corresponding password information according to the received application identifier, and feeding back the first information in which a password is not set to the mobile terminal when the corresponding password information is not found;

when the mobile terminal receives the first information, displaying a password setting interface for the user to set a password and sending the password set by the user to the electronic cigarette;

receiving, by the electronic cigarette, the password, and saving the password in association with the application identifier to generate the password information of a corresponding application.

The method for setting a password for an electronic cigarette further comprises:

when the electronic cigarette finds the password information corresponding to the application identifier, feeding back the second information in which a password has been set to the mobile terminal;

when the mobile terminal receives the second information, displaying a password changing interface for the user to change the password, and sending the password changed by the user to the electronic cigarette;

receiving, by the electronic cigarette, the password, and saving the password in association with the application identifier to change the password information of a corresponding application.

According to the method for setting a password for an electronic cigarette, after the electronic cigarette receives the password, and saves the password in association with the application identifier to generate the password information of a corresponding application, the method further comprises:

when the mobile terminal receives the operation of starting a target application in the electronic cigarette, searching for a target application identifier corresponding to the target application in the preset white list; and when the target application identifier is found, prompting the user to input the password, and when receiving the password, sending the received password and the target application identifier to the electronic cigarette;

searching, by the electronic cigarette, for the corresponding password information according to the target application identifier, and comparing the found password information with the received password; and when the comparison is successful, starting the target application.

According to the method for setting a password for an electronic cigarette, after the electronic cigarette receives the password, and saves the password in association with the application identifier to generate the password information of a corresponding application, the method further comprises:

when the electronic cigarette receives the operation of starting a target application, searching for a corresponding target application identifier in the preset white list;

when the target application identifier is found, prompting the user to input the password, and when the password is received, comparing the received password with the password information corresponding to the target application identifier; and when the comparison is successful, starting the target application.

The method for setting a password for an electronic cigarette further comprises:

when the target application identifier is not found, starting the target application, and displaying a password setting interface for the user to set the password information corresponding to the target application.

According to the method for setting a password for an electronic cigarette, when the mobile terminal receives the first information, providing a password setting interface for the user to set a password and sending the password set by the user to the electronic cigarette specifically comprises:

when the mobile terminal receives the first information, displaying a password setting interface, and monitoring an operation of inputting a password by the user within a preset time; and when the operation of inputting a password by the user is monitored, acquiring the password corresponding to the operation and sending the acquired password to the electronic cigarette.

According to the method for setting a password for an electronic cigarette, when the operation of inputting a password by the user is monitored, acquiring the password corresponding to the operation and sending the acquired password to the electronic cigarette specifically comprises:

when the operation of inputting the password by the user is monitored, acquiring the password corresponding to the operation, and determining the type of the password, wherein the type comprises at least text information, voice information, fingerprint information, and face information;

searching for the corresponding preset rule according to the type to which the password belongs, and determining whether the password meets the found preset rule;

when the rule is met, sending the password to the electronic cigarette.

According to the method for setting a password for an electronic cigarette, prior to the mobile terminal sending the request for setting a password to the electronic cigarette, the method further comprises:

establishing, by the electronic cigarette, a communication connection with the mobile terminal through a preset communication protocol, wherein the preset communication protocol comprises at least one or more of WIFI, Bluetooth, and USB.

A method for setting a password for an electronic cigarette comprises:

receiving, by an electronic cigarette, an instruction to set a password, and acquiring an application identifier carried by the instruction;

searching for a corresponding password information according to the application identifier, and when the password information is not found, displaying a password setting interface, and monitoring an operation of inputting a password by the user; and when the operation of inputting a password by the user is monitored, saving the password corresponding to the operation in association with the application identifier to generate the password information of a corresponding application.

The method for setting a password for an electronic cigarette further comprises:

when the password information corresponding to the application identifier is found, displaying a password changing interface and monitoring an operation of changing a password by the user;

when the operation of changing a password by the user is monitored, acquiring the password corresponding to the operation, and saving the password in association with the application identifier to change the password information of a corresponding application.

According to the method for setting a password for an electronic cigarette, after saving the password corresponding to the operation in association with the application identifier to generate the password information of a corresponding application when the operation of inputting a password by the user is monitored, the method further comprises:

when the electronic cigarette receives the operation of starting a target application, searching for a corresponding target application identifier in the preset white list;

when the target application identifier is found, prompting the user to input the password, and when the password is received, comparing the received password with the password information corresponding to the target application identifier; and when the comparison is successful, starting the target application.

The method for setting a password for an electronic cigarette further comprises:

when the target application identifier is not found, starting the target application, and displaying a password setting interface for the user to set the password information corresponding to the target application.

According to the method for setting a password for an electronic cigarette, when the operation of inputting a password by the user is monitored, saving the password corresponding to the operation in association with the application identifier to generate the password information of a corresponding application specifically comprises:

when the operation of setting the password by the user is monitored, acquiring the password corresponding to the operation, and determining the type of the password, wherein the type comprises at least text information, voice information, fingerprint information, and face information;

searching for the corresponding preset rule according to the type to which the password belongs, and determining whether the password meets the found preset rule;

when the rule is met, saving the password in association with the application identifier to generate the password information of a corresponding application.

A system for setting a password for an electronic cigarette comprises: an electronic cigarette and a mobile terminal;

wherein the mobile terminal is configured to send a request for setting a password to the electronic cigarette, wherein the request carries an application identifier;

the electronic cigarette is configured to search for the corresponding password information according to the received application identifier, and feed back the first information in which a password is not set to the mobile terminal when the corresponding password information is not found;

the mobile terminal is further configured to, when receiving the first information, display a password setting interface for the user to set a password and send the password set by the user to the electronic cigarette;

the electronic cigarette is further configured to receive the password, and save the password in association with the application identifier to generate the password information of a corresponding application.

According to the system for setting a password for an electronic cigarette, the electronic cigarette is provided with a communication module, and the communication module comprises at least one or more of WIFI, Bluetooth or USB.

According to a storage medium, a plurality of instructions are stored in the storage medium, and the instructions are adapted to be loaded by a processor and to perform the method for setting a password for an electronic cigarette as described above.

An electronic cigarette comprises:

a processor adapted to implement instructions; and a storage device adapted to store a plurality of instructions, wherein the instructions are adapted to be loaded by a processor and to perform the method for setting a password for an electronic cigarette as described above.

Beneficial Effects: Compared with the prior art, the present invention provides a method for setting a password for an electronic cigarette, a system, a storage medium, and an electronic cigarette, the method comprising: sending, by a mobile terminal, a request for setting a password to the electronic cigarette, wherein the request carries an application identifier; searching, by the electronic cigarette, for the corresponding password information according to the received application identifier, and feeding back the first information in which a password is not set to the mobile terminal when the corresponding password information is not found; when the mobile terminal receives the first information, displaying a password setting interface for the user to set a password and sending the password set by the user to the electronic cigarette; receiving, by the electronic cigarette, the password, and saving the password in association with the application identifier to generate the password information of a corresponding application. The present invention ensures that only users who know the password can use these applications by setting passwords for various functions and applications in the electronic cigarette, thereby avoiding accidental smoking and improving the safety of the use of the electronic cigarette.

DESCRIPTION OF THE EMBODIMENTS

The present invention provides a method for setting a password for an electronic cigarette, a system, a storage medium, and an electronic cigarette. In order to make the object, the technical solution and the effect of the present invention clearer and more explicit, the present invention will be further described in detail below with reference to the accompanying drawings and embodiments. It is to be understood that the specific embodiments described herein are merely illustrative of the present invention and are not intended to define the present invention.

It is to be understood by those skilled in the art that the singular forms such as "a", "one", "said" and "the" may also include plural forms unless specifically stated. It is to be further understood that the term "comprise" used in the specification of the present invention indicates the presence of a feature, an integer, a step, an operation, an element, and/or a component, but does not exclude the presence or addition of one or more other features, integers, steps, operations, elements, components and/or combination thereof. It will be understood that when an element is referred to as being "connected" or "coupled" to another element, the element may be directly connected or coupled to the other element or there may be an intermediate element. Further, "connected" or "coupled" as used herein may comprise either a wireless connection or a wireless coupling. The term "and/or" as used herein comprises all or any of the units and all combinations of one or more of the associated listed items.

Those skilled in the art will appreciate that all terms (comprising technical and scientific terms) as used herein have the same meaning as commonly understood by those skilled in the art to which the present invention belongs, unless otherwise defined. It is also to be understood that terms such as those defined in a general dictionary should be understood to have the same meaning as the meaning in the context of the prior art, and will not be explained in an idealized or excessively formal meaning unless specifically defined as herein.

The content of the present invention will be further described by the following description of embodiments with reference to the accompanying drawings.

Figure 1:
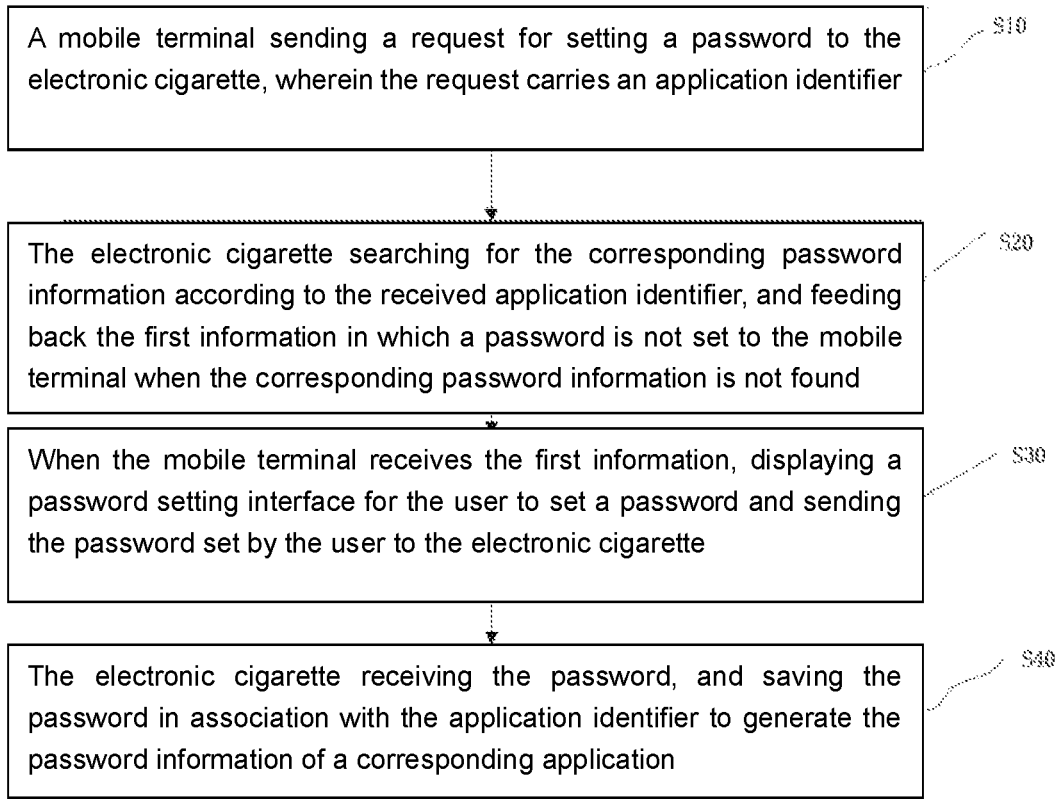
FIG. 1 is a flow chart of a preferred embodiment of a method for setting a password for an electronic cigarette according to the present invention.

Referring to FIG. 1, which is a flow chart of a preferred embodiment of a method for configuring display content of an electronic cigarette according to the pres-ent invention. The method comprises the following steps:

S10: a mobile terminal sending a request for setting a password to the electronic cigarette, wherein the request carries an application identifier;

S20: the electronic cigarette searching for the corresponding password information according to the received application identifier, and feeding back the first information in which a password is not set to the mobile terminal when the corresponding password information is not found;

S30: when the mobile terminal receives the first information, displaying a password setting interface for the user to set a password and sending the password set by the user to the electronic cigarette;

S40: the electronic cigarette receiving the password, and saving the password in association with the application identifier to generate the password information of a corresponding application.

In this embodiment, the mobile terminal sends a request for setting a password for the target application to the electronic cigarette, and when the electronic cigarette returns the information that the target application does not set a password, the password is collected by the mobile terminal and sent to the electronic cigarette, so as to set a password for each application or function in the electronic cigarette. In this way, the user can set a password for each application or function in the electronic cigarette autonomously, so that only the user who has passed the password verification can use these functions, thereby preventing the unprivileged user from smoking or using the electronic cigarette, and improving the safety of the use of the electronic cigarette.

Specifically, in Step S10, the mobile terminal refers to an electronic device that establishes a communication connection with the electronic cigarette, which can be a device such as a smart phone, a Bluetooth headset, a tablet computer, a PC, and the like. Accordingly, the electronic cigarette is configured with a communication module for communicating with the mobile terminal. The communication module may be a wired communication module, such as a USB interface, a type C interface, etc., or may be a wireless communication module, such as a Bluetooth module, a WIFI module, or the like. Therefore, prior to Step S10, the method further comprises:

S01, establishing, by the electronic cigarette, a communication connection with the mobile terminal through a preset communication protocol, wherein the preset communication protocol comprises at least one or more of WIFI, Bluetooth, and USB.

Further, in order to ensure the security of setting a password of the electronic cigarette, in the process of establishing a communication connection between the electronic cigarette and the mobile terminal, a process of identity verification may be added: the mobile terminal sends a connection request to the electronic cigarette, wherein the connection request carries verification information for verifying the mobile terminal; when the electronic cigarette receives the connection request, acquires the verification information, and compares the verification information with the verification information pre-stored in the electronic cigarette; when the verification information is the same as the verification information pre-stored in the electronic cigarette, verifies by the mobile terminal and allows the mobile terminal to establish a communication connection with it. In an actual application, the verification information may be a device identifier of the mobile terminal, so that only the mobile terminal that has been bound to the electronic cigarette is allowed to establish a communication connection with the electronic cigarette. Of course, the verification information may also be a verification password for input.

In this embodiment, the application identifier refers to the identifier information of an application to be set with a password, which may be a name or a code of the application. The application refers to various applications or functions included in the electronic cigarette, for example, unlocking the electronic cigarette, igniting, setting the working efficiency of the electronic cigarette, setting the working temperature of the electronic cigarette, and the like. Each application corresponds to a unique piece of identifier information. In an actual application, the request may carry one application identifier or a plurality of application identifiers. When the request carries an application identifier, it indicates that the mobile terminal only requests to set a password for one application at that time; when the request carries a plurality of application identifiers, it indicates that the mobile terminal requests to set a password for a plurality of applications at that time simultaneously. Of course, when a password is set for a plurality of applications at the same time, the passwords of the plurality of applications may be the same, which may save the time for the user and facilitate the memory of the user; the passwords of the plurality of applications may also be different, so that each application has a unique password, which increases the security of starting each application. In this embodiment, the password setting process is described, with the request carrying an application identifier as an example. It can be understood that, in a specific execution process, the mobile terminal may send a request for setting a password to the electronic cigarette in response to an instruction of the user to set a password. Of course, the password setting process can also be triggered during the application starting process.

In Step S20, the password information refers to a data group in which an application identifier is saved in association with a password. A password corresponding to the application may be subsequently searched for by matching the received application identifier with the application identifier in the data group, and then the password verification is completed. A password information base is set in advance in the electronic cigarette, in which password information corresponding to all applications in which passwords have been set is stored. When the electronic cigarette receives the request for setting a password sent by the mobile terminal, the application identifier carried by the request is acquired, and the corresponding password information is searched for in the preset password information database. When the password information is not found, it indicates that the application corresponding to the application identifier has not been set with a password, and the electronic cigarette feeds back the first information in which a password is not set to the mobile terminal at this time.

Figure 2:
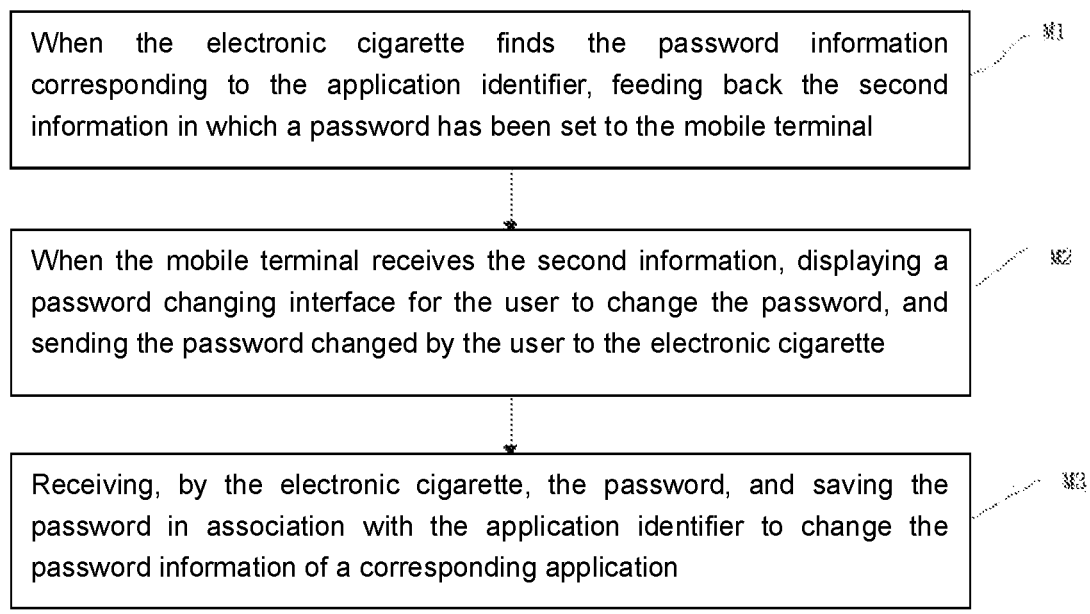
FIG. 2 is a flow chart of changing a password in an embodiment of a method for setting a password for an electronic cigarette according to the present invention.

In an embodiment of the present invention, as shown in FIG. 2, the method further comprises:

M1, when the electronic cigarette finds the password information corresponding to the application identifier, feeding back the second information in which a password has been set to the mobile terminal;

M2, when the mobile terminal receives the second information, displaying a password changing interface for the user to change the password, and sending the password changed by the user to the electronic cigarette;

M3, receiving, by the electronic cigarette, the password, and saving the password in association with the application identifier to change the password information of a corresponding application.

Specifically, in Step M1, when the electronic cigarette finds the password information corresponding to the application identifier in the preset password information database, it indicates that the corresponding application has been set with a password, and the electronic cigarette feeds back the second information in which a password has been set to the mobile terminal at this time.

In Step M2, the password changing interface refers to an interactive interface for the user to change the password. When the mobile terminal receives the second information fed back by the electronic cigarette, the mobile terminal displays a password changing interface on the display interface, and monitors the operation of changing the password by the user within a preset time. When the operation of changing the password is monitored, the changed password of the user is sent to the electronic cigarette. In actual applications, in order to avoid misoperation, the existing password can be verified before the user inputs the changed password, and the new password input by the user is received only after the existing password is verified. Specifically, when receiving the second information, the mobile terminal displays a password changing interface, and monitors a third password input by the user within a preset time; when monitoring the third password, generates verification information according to the third password, and sends the verification information to the electronic cigarette, wherein the verification information carries the third password; the electronic cigarette acquires the third password, compares the third password with the password corresponding to the application identifier, and feeds back the third information to the mobile terminal when the comparison is successful; when receiving the third information, the mobile terminal receives the changed password input by the user and sends the changed password to the electronic cigarette. This not only limits the privilege to change the password by the user, but also avoids the inconvenience caused to the user by misoperation or the random change of the password.

In Step M3, the electronic cigarette receives the changed password, saves the changed password in association with the application identifier to generate new password information, and replaces the password information in the password information base with new password information, so as to complete the step of changing the password information of the corresponding application.

Figure 3:
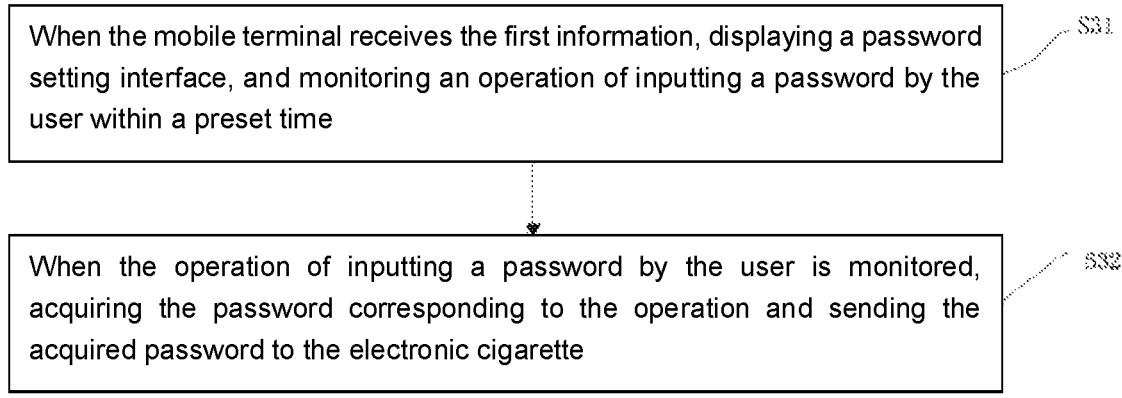
FIG. 3 is a flowchart of step S30 in a method for setting a password for an electronic cigarette according to the present invention.

In Step S30, as shown in FIG. 3, when the mobile terminal receives the first information, displaying a password setting interface for the user to set a password and sending the password set by the user to the electronic cigarette may specifically comprise:

S31, when the mobile terminal receives the first information, displaying a password setting interface, and monitoring an operation of inputting a password by the user within a preset time; and S32, when the operation of inputting a password by the user is monitored, acquiring the password corresponding to the operation and sending the acquired password to the electronic cigarette.

Specifically, in Step S31, the preset time refers to a preset time when the operation of inputting a password by the user is monitored, for example, 10 S, 1 min. When the password input by the user is monitored within the preset time, Step S32 is performed. When the password input by the user is not monitored within the preset time, the mobile terminal closes the password setting interface and prompts to end the password setting. In this way, the user is given a time limit to input the password, so as to prevent the mobile terminal from being in the monitored state all the time, which is beneficial to reducing the energy consumption of the mobile terminal.

In Step S32, in order to ensure that it is difficult to crack the password set by the user to a certain extent, before the mobile terminal receives the password input by the user and sends it to the electronic cigarette, the mobile terminal may further comprise a step of detecting whether the password meets the preset rule. At the same time, because the user enters a password in various ways, there may also be various types of the generated passwords. For example, the user may input the text information directly using an input method, or input the fingerprint information using a fingerprint collecting device, and may also collect the face image information as a password through a camera, and input the voice information or the like as a password using a microphone. Therefore, in order to detect various types of passwords, it is possible to improve the accuracy of detecting the input password by setting a rule for each type of passwords to determine whether it meets the conditions.

Figure 4:
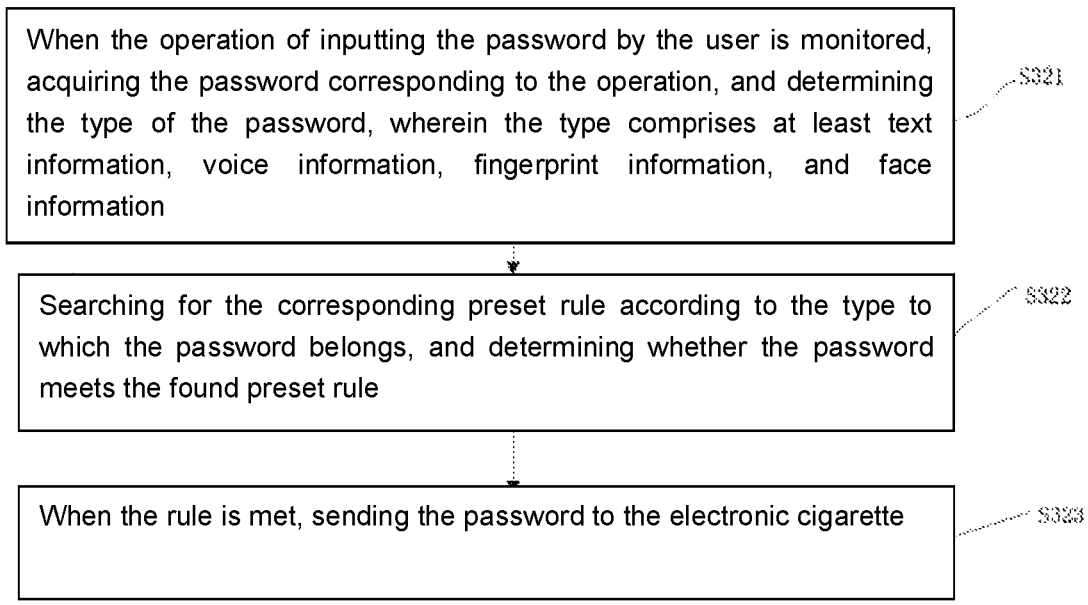
FIG. 4 is a flowchart of step S32 in a method for setting a password for an electronic cigarette according to the present invention.

Exemplarily, as shown in FIG. 4, when the operation of inputting a password by the user is monitored, acquiring the password corresponding to the operation and sending the acquired password to the electronic cigarette may specifically comprise:

S321, when the operation of inputting the password by the user is monitored, acquiring the password corresponding to the operation, and determining the type of the password, wherein the type comprises at least text information, voice information, fingerprint information, and face information;

S322, searching for the corresponding preset rule according to the type to which the password belongs, and determining whether the password meets the found preset rule;

S323, when the rule is met, sending the password to the electronic cigarette.

Specifically, in Step S321, the type refers to the form in which the password is carried. In this embodiment, the type comprises at least text information, voice information, fingerprint information, and face information. Of course, in actual applications, the type may further comprise gesture information, pressure information of pressing the touch screen, iris information collected by the mobile terminal, retina information, and the like. In Step S322, the preset rule is a preset detection rule, and each type of passwords corresponds to a preset rule. The preset rule may be a system default setting, or may be set by the user according to his own demands. For example, the preset rule corresponding to the text information may be as follows: the length of the text information is greater than the preset number of characters, and the text information comprises at least uppercase letters, lowercase letters, and numbers; the preset rule corresponding to the voice information may be as follows: the voice duration is greater than the preset duration, and the noise intensity in the voice is less than the preset threshold; the preset rule corresponding to the fingerprint information is as follows: the input fingerprint image must contain a preset number of feature points; the preset rule corresponding to the face information is as follows: the input face image must contain the entire face, and the feature points contained in the image are larger than the preset threshold. When the password input by the user is "123456", the mobile terminal first determines that the type to which it belongs is text information, and then determines whether it meets the rule corresponding to the text information. Since the password contains uppercase and lowercase letters, it is determined that the password does not meet the preset rule, and the mobile terminal displays the information that the password is unqualified, and prompts the user to input the password again.

It should be noted that, in actual applications, the threshold of the number of times of the collected password may also be set in the mobile terminal. For example, the threshold of the number of times may be 3 times, 5 times or more times. When the number of times the user inputs the password that does not meet the preset rule is greater than the threshold of the number of times, the mobile terminal closes the password setting interface and prompts the user for information that the password setting fails. This can effectively prevent users from inputting invalid passwords multiple times and wasting user time. Of course, in another embodiment of the present invention, when the number of times the user inputs the password that does not meet the preset rule is greater than the threshold of the number of times, the mobile terminal randomly generates a default password and displays it to the user, and the user may subsequently use the default password to start the application. The default password is in the form of text information.

In Step S40, the electronic cigarette receives the password, and saves the password in association with the application identifier to generate application password information corresponding to the application identifier. When the application is subsequently started, it is only necessary to input the password in the mobile terminal or the electronic cigarette.

Figure 5:
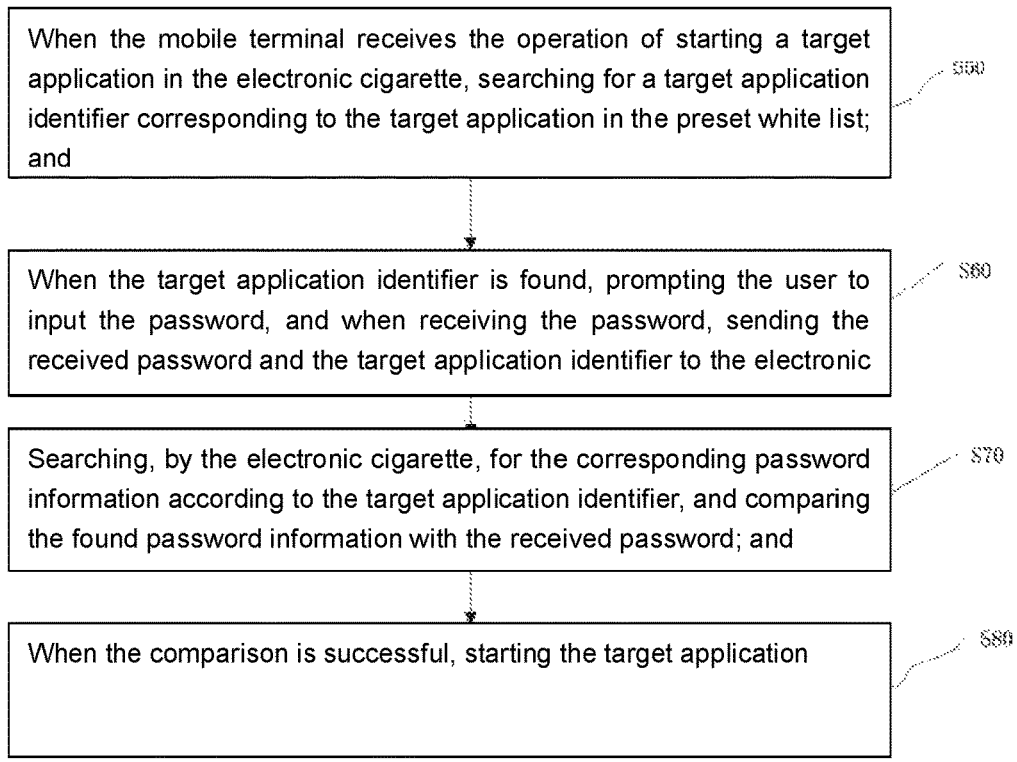
FIG. 5 is a flow chart of starting a target application in an embodiment of a method for setting a password for an electronic cigarette according to the present invention.

In an embodiment of the present invention, after Step S40, the method further comprises a process of starting the corresponding application by verifying the password, as shown in FIG. 5, which may specifically comprise:

S50, when the mobile terminal receives the operation of starting a target application in the electronic cigarette, searching for a target application identifier corresponding to the target application in the preset white list; and S60, when the target application identifier is found, prompting the user to input the password, and when receiving the password, sending the received password and the target application identifier to the electronic cigarette;

S70, searching, by the electronic cigarette, for the corresponding password information according to the target application identifier, and comparing the found password information with the received password; and S80, when the comparison is successful, starting the target application.

Specifically, in Steps S50 and S60, the preset white list refers to a pre-set application identifier corresponding to an application in which the password that has been set is saved by the user. When the mobile terminal receives the operation of starting the target application in the electronic cigarette, the target application identifier corresponding to the target application is searched for in the preset white list. When the target application identifier is found, it indicates that the target application has been set with a password, the user is prompted to input a password, and when the password input by the user is received, the password is sent to the electronic cigarette. When the target application identifier is not found, it indicates that the target application is not set with a password. At this time, the target application is directly started, and a password setting interface is displayed on the display interface, so that the user sets a password for the target application. By storing the application in which the password is set in the white list, it is possible to quickly confirm whether the target application to be started has been set with a password, so that the mobile terminal can respond quickly according to the setting situation without the operation of communicating with the electronic cigarette to retrieve the password multiple times, thereby improving the starting speed of the target application.

In Steps S70 and S80, the electronic cigarette receives the password and the target application identifier, matches the target application identifier with a preset password information database to search for a corresponding password, and then compares the found password with the received password. When the comparison is successful, it indicates that the password input by the user is correct, and the user is privileged to use the target application at this time. The electronic cigarette starts the target application. When the comparison fails, it indicates that the password input by the user is incorrect, and the user is not privileged to use the target application at this time. The electronic cigarette feeds back the information that the password is incorrect to the mobile terminal. Of course, in order to improve the verification efficiency, when receiving the password, the electronic cigarette may first determine whether the type to which the password belongs is correct, when the type is correct, perform comparison; and when the type is incorrect, directly feed back the information that the password is incorrect to the mobile terminal without further comparison.

Figure 6:
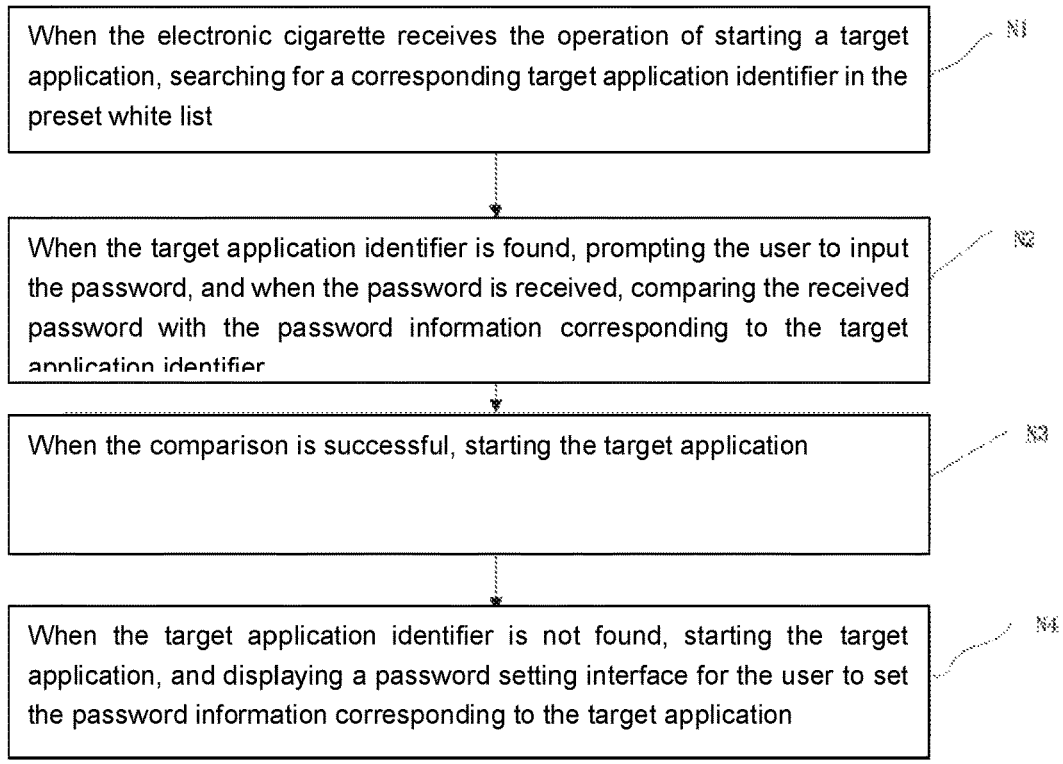
FIG. 6 is a flowchart of starting a target application in another embodiment of a method for setting a password for an electronic cigarette according to the present invention.

In another embodiment of the present invention, the password verification can also be completed directly in the electronic cigarette to start the corresponding application in the electronic cigarette, as shown in FIG. 6. Therefore, after Step S40, the method further comprises:

N1, when the electronic cigarette receives the operation of starting a target application, searching for a corresponding target application identifier in the preset white list;

N2, when the target application identifier is found, prompting the user to input the password, and when the password is received, comparing the received password with the password information corresponding to the target application identifier;

N3, when the comparison is successful, starting the target application;

N4, when the target application identifier is not found, starting the target application, and displaying a password setting interface for the user to set the password information corresponding to the target application.

Specifically, the white list is also pre-stored in the electronic cigarette, and it is determined whether a password is set by searching for the target application identifier in the white list. The process of verifying the password of the electronic cigarette is the same as the steps in the above embodiment, which will not be described in detail herein. The electronic cigarette directly receives the password input by the user, and the password verification can still be completed in the case that the electronic cigarette does not establish a communication connection with the mobile terminal, so that the electronic cigarette independently starts the target application, which is convenient for the user to use.

Embodiment 1

The present invention provides a method for setting a password for an electronic cigarette. In the method for setting a password, each step is independently performed by the electronic cigarette without communication with a mobile terminal, and the method specifically comprises:

receiving, by an electronic cigarette, an instruction to set a password, and acquiring an application identifier carried by the instruction;

searching for a corresponding password information according to the application identifier, and when the password information is not found, displaying a password setting interface, and monitoring an operation of inputting a password by the user; and when the operation of inputting a password by the user is monitored, saving the password corresponding to the operation in association with the application identifier to generate the password information of a corresponding application.

The method for setting a password for an electronic cigarette further comprises:

when the password information corresponding to the application identifier is found, displaying a password changing interface and monitoring an operation of changing a password by the user;

when the operation of changing a password by the user is monitored, acquiring the password corresponding to the operation, and saving the password in association with the application identifier to change the password information of a corresponding application.

After saving the password corresponding to the operation in association with the application identifier to generate the password information of a corresponding application when the operation of inputting a password by the user is monitored, the method further comprises:

when the electronic cigarette receives the operation of starting a target application, searching for a corresponding target application identifier in the preset white list;

when the target application identifier is found, prompting the user to input the password, and when the password is received, comparing the received password with the password information corresponding to the target application identifier; and when the comparison is successful, starting the target application.

The method for setting a password for an electronic cigarette further comprises:

when the target application identifier is not found, starting the target application, and displaying a password setting interface for the user to set the password information corresponding to the target application.

According to the method for setting a password for an electronic cigarette, when the operation of inputting a password by the user is monitored, saving the password corresponding to the operation in association with the application identifier to generate the password information of a corresponding application specifically comprises:

when the operation of setting the password by the user is monitored, acquiring the password corresponding to the operation, and determining the type of the password, wherein the type comprises at least text information, voice information, fingerprint information, and face information;

searching for the corresponding preset rule according to the type to which the password belongs, and determining whether the password meets the found preset rule;

when the rule is met, saving the password in association with the application identifier to generate the password information of a corresponding application.

It should be noted that the specific implementation process of the method for setting the password of the electronic cigarette is the same as the process in the above preferred embodiment, which will not be described in detail herein. In Embodiment 1, the password is directly set by the electronic cigarette and the password is verified without interaction with the external terminal, thereby improving the independence of setting a password and starting an application by the electronic cigarette.

Embodiment 2

The present invention further provides a storage medium, wherein a plurality of instructions are stored in the storage medium, and the instructions are adapted to be loaded by a processor and to perform the method for setting a password for an electronic cigarette according to Embodiment 1.

Embodiment 3

Figure 7:
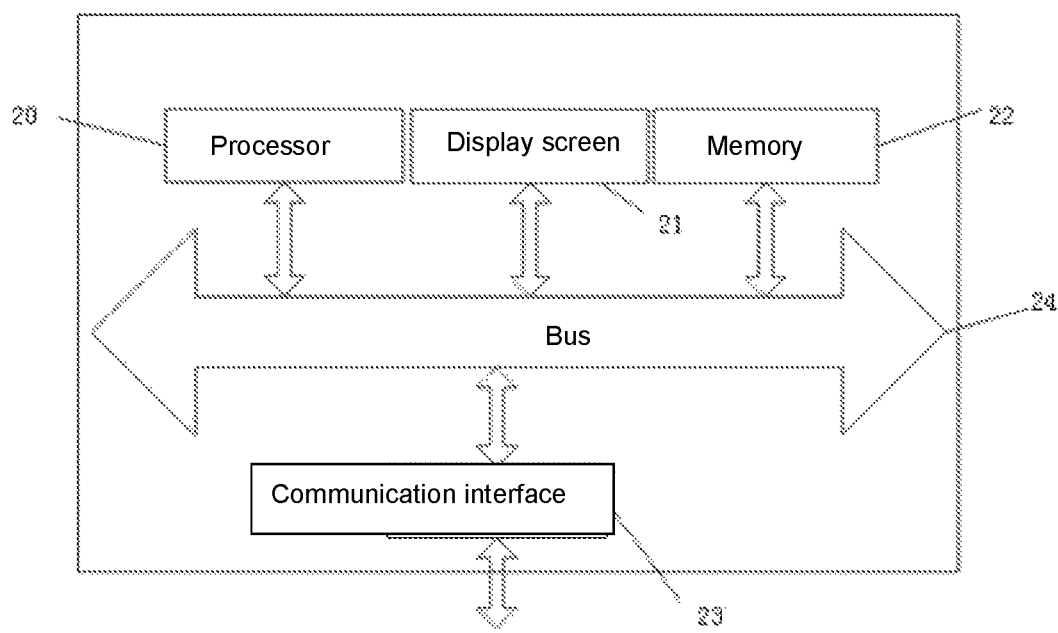
FIG. 7 is a schematic diagram illustrating the structure of an electronic cigarette according to the present invention.

The present invention further provides an electronic cigarette, as shown in FIG. 7, which comprises at least one processor 20; a display screen 21; and a memory 22, and may further comprise a communication interface 23 and a bus 24. The processor 20, the display screen 21, the memory 22, and the communication interface 23 can complete communication with each other through the bus 24. The display screen 21 is configured to display a user guiding interface preset in the initial setting mode. The communication interface 23 can transmit information. The processor 20 can call the logic instructions in the memory 22 to perform the method in the above Embodiment 1.

In addition, when the logic instructions in the memory 22 described above may be implemented in the form of a software functional unit and sold or used as a stand-alone product, the logic instructions may be stored in a computer-readable storage medium.

As a computer-readable storage medium, the memory 22 can be configured to store a software program, a computer-executable program, such as a program instruction or a module corresponding to the method in the embodiment of the present disclosure. The processor 30 executes the functional application and data processing by running a software program, an instruction or a module stored in the memory 22, so as to implement the method in Embodiment 1.

The memory 22 may comprise a storage program area and a storage data area, wherein the storage program area may store an operating system, an application required for at least one function; the storage data area may store data created according to the use of the electronic cigarette, and the like. Further, the memory 22 may comprise a high speed random access memory, and may also comprise a nonvolatile memory. Various media in which program codes may be stored, such as a USB flash disk, a mobile hard disk, a Read-Only Memory (ROM), a Random Access Memory (RAM), a magnetic disk, or an optical disk, can also be a transient storage medium.

In addition, the specific processes described above in which the storage medium and a plurality of instructions in the electronic cigarette are loaded and performed by a processor have been described in detail in the above methods, which will not be repeatedly described herein.

Embodiment 4

Figure 8:
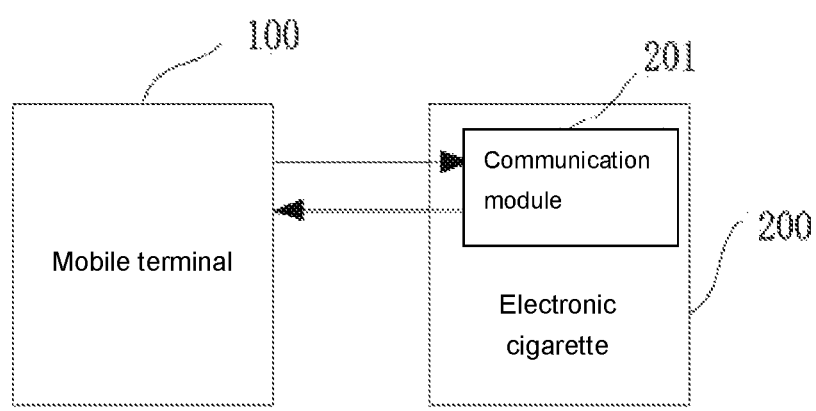
FIG. 8 is a schematic diagram illustrating the structure of a system for setting a password for an electronic cigarette according to the present invention.

The present invention further provides a system for setting a password for an electronic cigarette. As shown in FIG. 8, the system comprises a mobile terminal 100 and an electronic cigarette 200;

the mobile terminal 100 is configured to send a request for setting a password to the electronic cigarette, wherein the request carries an application identifier;

the electronic cigarette 200 is configured to search for the corresponding password information according to the received application identifier, and feed back the first information in which a password is not set to the mobile terminal when the corresponding password information is not found;

the mobile terminal 100 is further configured to, when receiving the first information, display a password setting interface for the user to set a password and send the password set by the user to the electronic cigarette;

the electronic cigarette 200 is further configured to receive the password, and save the password in association with the application identifier to generate the password information of a corresponding application.

The electronic cigarette 200 is configured with a communication module 201, and the communication module 201 comprises at least one of WIFI, Bluetooth or USB.

It should be noted that the above embodiments are merely illustrative of the technical solutions of the present invention, and are not intended to limit the technical solutions; although the present invention has been described in detail with reference to the foregoing embodiments, those skilled in the art will understand that the technical solutions described in the foregoing embodiments may still be modified, or some of the technical features may be equivalently replaced; these modifications and substitutions do not make the essence of the corresponding technical solutions depart from the spirit and scope of the technical solutions of the embodiments of the present invention.

What is claimed is:

1. A method for setting a password for an electronic cigarette, comprising:
    sending, by a mobile terminal, a request for setting a password for the electronic cigarette, wherein the request carries an application identifier;
    searching, by the electronic cigarette, for the corresponding password information according to the received application identifier, and feeding back a first information in which a password is not set for the mobile terminal when the corresponding password information is not found;
    when the mobile terminal receives the first information, displaying a password setting interface for the user to set a password and sending the password set by the user to the electronic cigarette;
    receiving, by the electronic cigarette, the password, and saving the password in association with the application identifier to generate the password information of a corresponding application.

2. The method for setting a password for an electronic cigarette according to claim 1, further comprising:
    when the electronic cigarette finds the password information corresponding to the application identifier, feeding back the second information in which a password has been set to the mobile terminal;
    when the mobile terminal receives the second information, displaying a password changing interface for the user to change the password, and sending the password changed by the user to the electronic cigarette;

receiving, by the electronic cigarette, the password, and saving the password in association with the application identifier to change the password information of a corresponding application.

3. The method for setting a password for an electronic cigarette according to claim 1, wherein after the electronic cigarette receives the password, and saves the password in association with the application identifier to generate the password information of a corresponding application, the method further comprises:

when the mobile terminal receives the operation of starting a target application in the electronic cigarette, searching for a target application identifier corresponding to the target application in the preset white list; and when the target application identifier is found, prompting the user to input the password, and when receiving the password, sending the received password and the target application identifier to the electronic cigarette;

searching, by the electronic cigarette, for the corresponding password information according to the target application identifier, and comparing the found password information with the received password; and when the comparison is successful, starting the target application.

4. The method for setting a password for an electronic cigarette according to claim 1, wherein after the electronic cigarette receives the password, and saves the password in association with the application identifier to generate the password information of a corresponding application, the method further comprises:

when the electronic cigarette receives the operation of starting a target application, searching for a corresponding target application identifier in the preset white list;

when the target application identifier is found, prompting the user to input the password, and when the password is received, comparing the received password with the password information corresponding to the target application identifier; and when the comparison is successful, starting the target application.

5. The method for setting a password for an electronic cigarette according to claim 3, further comprising:

when the target application identifier is not found, starting the target application, and displaying a password setting interface for the user to set the password information corresponding to the target application.

6. The method for setting a password for an electronic cigarette according to claim 4, further comprising:

when the target application identifier is not found, starting the target application, and displaying a password setting interface for the user to set the password information corresponding to the target application.

7. The method for setting a password for an electronic cigarette according to claim 1, wherein when the mobile terminal receives the first information, providing a password setting interface for the user to set a password and sending the password set by the user to the electronic cigarette specifically comprises:

when the mobile terminal receives the first information, displaying a password setting interface, and monitoring an operation of inputting a password by the user within a preset time; and when the operation of inputting a password by the user is monitored, acquiring the password corresponding to the operation and sending the acquired password to the electronic cigarette.

8. The method for setting a password for an electronic cigarette according to claim 7, wherein when the operation of inputting a password by the user is monitored, acquiring the password corresponding to the operation and sending the acquired password to the electronic cigarette specifically comprises:

when the operation of inputting the password by the user is monitored, acquiring the password corresponding to the operation, and determining the type of the password, wherein the type comprises at least text information, voice information, fingerprint information, and face information;

searching for the corresponding preset rule according to the type to which the password belongs, and determining whether the password meets the found preset rule;

when the rule is met, sending the password to the electronic cigarette.

9. The method for setting a password for an electronic cigarette according to claim 1, wherein prior to the mobile terminal sending the request for setting a password for the electronic cigarette, the method further comprises:

establishing, by the electronic cigarette, a communication connection with the mobile terminal through a preset communication protocol, wherein the preset communication protocol comprises at least one or more of WIFI, Bluetooth, and USB.

* * * * *